United States Patent
Banno

(10) Patent No.: US 11,449,287 B2
(45) Date of Patent: Sep. 20, 2022

(54) SERVER AND NON-TRANSITORY COMPUTER-READABLE MEDIUM STORING COMPUTER-READABLE INSTRUCTIONS FOR SERVER

(71) Applicant: BROTHER KOGYO KABUSHIKI KAISHA, Nagoya (JP)

(72) Inventor: Hirokazu Banno, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 360 days.

(21) Appl. No.: 16/827,946

(22) Filed: Mar. 24, 2020

(65) Prior Publication Data

US 2020/0311662 A1    Oct. 1, 2020

(30) Foreign Application Priority Data

Mar. 28, 2019    (JP) .............................. JP2019-064047

(51) Int. Cl.
*G06F 3/12*    (2006.01)
*H04N 1/00*    (2006.01)
*G06Q 10/08*    (2012.01)

(52) U.S. Cl.
CPC .......... *G06F 3/1224* (2013.01); *G06F 3/1229* (2013.01); *G06F 3/1231* (2013.01); *H04N 1/0005* (2013.01); *H04N 1/00084* (2013.01); *G06F 3/121* (2013.01); *G06F 3/1293* (2013.01); *G06Q 10/087* (2013.01)

(58) Field of Classification Search
None
See application file for complete search history.

(56) References Cited

U.S. PATENT DOCUMENTS

| | | | |
|---|---|---|---|
| 6,347,199 B1* | 2/2002 | Morihara | G03G 15/0126 399/81 |
| 7,921,175 B2* | 4/2011 | Noguchi | G03G 15/5079 358/1.15 |
| 2002/0072998 A1* | 6/2002 | Haines | G06Q 10/087 705/28 |
| 2008/0267642 A1* | 10/2008 | Hadano | G03G 15/5079 399/27 |

(Continued)

FOREIGN PATENT DOCUMENTS

JP    2007-199942 A    8/2007

*Primary Examiner* — Miya J Williams
(74) *Attorney, Agent, or Firm* — Scully, Scott, Murphy & Pressser, PC

(57) ABSTRACT

A server may after a shipping process has been executed, select first device identification information from among N2 pieces of device identification information (the N2 being an integer satisfying 2≤N2≤N1) by using N2 pieces of consumable article information among N1 pieces of the consumable article information, the first device identification information identifying a first device of which consumable article is to be exchanged first. The server may send a first notification execution request to an external device, the first notification execution request being for causing the external device to execute a first notification process, and the first notification process being for notifying a user that the consumable article of the first device identified by the first device identification information is to be exchanged.

11 Claims, 10 Drawing Sheets

(56) References Cited

U.S. PATENT DOCUMENTS

| | | | |
|---|---|---|---|
| 2012/0148267 A1* | 6/2012 | Kawai | G03G 15/556 |
| | | | 399/8 |
| 2017/0090830 A1* | 3/2017 | Tomono | G06F 3/1285 |
| 2019/0094782 A1* | 3/2019 | Sato | G03G 15/556 |

* cited by examiner

FIG. 2

User Table 32

| User Name | Password | Address Information | PIN Code |
|---|---|---|---|
| UN | PW | AD | 1234 |

Device Table 34

| User Name | Serial Number | Access Token |
|---|---|---|
| UN | SN1 | AT1 |
| UN | SN2 | AT2 |
| UN | SN3 | AT3 |

Cartridge Table 36

| Serial Number | Type | Remaining Amount Information | Mounted Date and Time | Order Flag |
|---|---|---|---|---|
| SN1 | BK01 | 10 | 2019.02.08 15:00 | ON |
| SN2 | BK01 | 20 | 2019.02.09 15:00 | ON |
| SN3 | BK01 | 40 | 2019.02.10 15:00 | OFF |

(Second Embodiment) Determination Information (Determination Date and Time or Empty Information)

Shipping Table 38

| User Name | Type | Shipped Number | Unmounted Number | Shipping Date and Time | Notification Flag |
|---|---|---|---|---|---|
| UN | BK01 | 3 | 2 | 2019.3.10 12:00 | OFF |

(Processes of Storing Device Information and Remaining Amount Information)

(Specific Case C1(Continuation of FIG. 6))

FIG. 8

(Specific Case C2)

Printer 200 → SP Server 10

(T150) State Notification (Serial Number SN2, Remaining Amount Information "20%")

Shipped Number and Shipping Date and Time Not Obtained Yet (T152) Store — 36

| Serial Number | Type | Remaining Amount Information | Mounted Date and Time | Order Flag |
|---|---|---|---|---|
| SN1 | BK01 | 15 | 2019.02.09 15:00 | ON |
| SN2 | BK01 | 20 | 2019.02.10 15:00 | OFF |
| SN3 | BK01 | 80 | 2019.03.01 15:00 | OFF |

Processes same as T54 to T58 of FIG.6 are executed for Printer 200

(T160) Obtain Shipped Number and Shipping Date and Time from Sipping Server (Stock Shortage) — 38

| User Name | Type | Shipped Number | Unmounted Number | Shipping Date and Time | Notification Flag |
|---|---|---|---|---|---|
| UN | BK01 | 1 | 1 | 2019.03.10 12:00 | OFF |

Predetermined Number of Days (e.g., 3 days) Elapsed — 36

| Serial Number | Type | Remaining Amount Information | Mounted Date and Time | Order Flag |
|---|---|---|---|---|
| SN1 | BK01 | 12 | 2019.02.09 15:00 | ON |
| SN2 | BK01 | 15 | 2019.02.10 15:00 | ON |

Same as T70 to T74 of FIG.6

(T176) Specify Serial Numbers SN1, SN2 Satisfying Remaining Amount ≤ Threshold (T178) Select Serial Number SN1 with Lowest Remaining Amount Printer 100

(T180) Notification Display Request (T182) Display Notification Screen (T184) Exchange Operation (T200) State Notification (Serial Number SN1, Remaining Amount Information "100%")

(T202) Remaining Amount Increased (T204) Unmounted Number "1" → "0"

(T206) Order Flag "ON" → "OFF"

(T208) Store (T210) Determine Notification Flag = "ON"

(T212) Determine Unmounted Number = "0"

(T214) Notification Flag "ON" → "OFF"

FIG. 9

(Specific Case C3)

Printer 100 — SP Server 10

Same as T50 to T60 of FIG.6

Table 36:

| Serial Number | Type | Remaining Amount Information | Mounted Date and Time | Order Flag |
|---|---|---|---|---|
| SN1 | BK01 | 10 | 2019.02.08 15:00 | ON |
| SN2 | BK01 | 15 | 2019.02.09 15:00 | ON |
| SN3 | BK01 | 20 | 2019.02.10 15:00 | ON |

Table 38:

| User Name | Type | Shipped Number | Unmounted Number | Shipping Date and Time | Notification Flag |
|---|---|---|---|---|---|
| UN | BK01 | 3 | 3 | 2019.03.10 12:00 | OFF |

Ink cartridges arrive before predetermined number of days elapses (T240) Exchange Operation (T250) State Notification (Serial Number SN1, Remaining Amount Information "100%")

(T252) Remaining Amount Increased (T254) Unmounted Number "3" → "2"

(T256) Order Flag "ON" → "OFF"

Table 38:

| User Name | Type | Shipped Number | Unmounted Number | Shipping Date and Time | Notification Flag |
|---|---|---|---|---|---|
| UN | BK01 | 3 | 2 | 2019.03.10 12:00 | OFF |

(T258) Store (T260) Determine Notification Flag = "OFF"

Predetermined Number of Days (e.g., 3 days) Elapsed

Table 36:

| Serial Number | Type | Remaining Amount Information | Mounted Date and Time | Order Flag |
|---|---|---|---|---|
| SN1 | BK01 | 98 | 2019.03.12 15:00 | OFF |
| SN2 | BK01 | 12 | 2019.02.09 15:00 | ON |
| SN3 | BK01 | 15 | 2019.02.10 15:00 | ON |

(T270) Determine Predetermined Number of Days Elapsed (T272) Notification Flag "OFF" → "ON"

(T274) Determine Unmounted Number > 0

(T276) Specify Serial Numbers SN2, SN3 Satisfying Remaining Amount ≤ Threshold (T278) Select Serial Number SN2 with Lowest Remaining Amount Printer 200

(T280) Notification Display Request (T282) Display Notification Screen

SERVER AND NON-TRANSITORY COMPUTER-READABLE MEDIUM STORING COMPUTER-READABLE INSTRUCTIONS FOR SERVER

CROSS-REFERENCE TO RELATED APPLICATION

This application claims priority to Japanese Patent Application No. 2019-064047 filed on Mar. 28, 2019, the contents of which are hereby incorporated by reference into the present application.

TECHNICAL FIELD

The disclosure herein discloses art related to a server configured to execute a shipping process for shipping a consumable article to a user.

DESCRIPTION OF RELATED ART

A maintenance management system for an image forming device is known. The maintenance management system is configured to ship a container that contains a replacement part. The shipped container is connected to a side surface of the image forming device. When the container is connected, the image forming device locks the container. Locking the container prohibits the replacement part within the container from being taken out. Then, the image forming device sends an authentication code for releasing the lock to an information management device. A maintenance personnel who performs part exchange inputs the authentication code acquired from the information management device to the image forming device to release the lock of the container. Due to this, the maintenance personnel can take out the replacement part from the container and exchange parts.

SUMMARY

In the above-described technique, no considerations are given to a situation in which a plurality of image processing devices is each capable of having the same part mounted thereon. In such a situation where a plurality of image processing devices is present, it may be difficult for a maintenance personnel to find out in which image processing device the part is to be mounted.

The disclosure herein provides a technique that enables a user to easily find a device of which consumable article is to be exchanged from among a plurality of devices all capable of having the same consumable article mounted thereon.

A server disclosed herein may comprise: a processor; and a storage storing computer-readable instructions therein. The computer-readable instructions, when executed by the processor, may cause the server to: from each of N devices (the N being an integer of 2 or larger) which are capable of having a same consumable article mounted thereon, receive device identification information identifying the device and consumable article information related to a consumable article currently mounted on the device; in a case where N pieces of the device identification information and N pieces of the consumable article information are received from the N devices, store each of the N pieces of the device identification information in association with the consumable article information received with the device identification information in a memory; in a case where N1 pieces of the consumable article information (the N1 being an integer satisfying 2≤N1≤N) among the N pieces of the consumable article information in the memory satisfy a predetermined consumable article exchange condition, execute a shipping process for shipping N1 consumable articles to a user of the N devices; after the shipping process has been executed, select first device identification information from among N2 pieces of the device identification information (the N2 being an integer satisfying 2≤N2≤N1) by using N2 pieces of the consumable article information among the N1 pieces of the consumable article information, the N2 pieces of the device identification information being in association with the N2 pieces of the consumable article information, and the first device identification information identifying a first device of which consumable article is to be exchanged first among N2 devices; and send a first notification execution request to an external device, the first notification execution request being for causing the external device to execute a first notification process, and the first notification process being for notifying the user that the consumable article of the first device identified by the first device identification information is to be exchanged.

A method implemented by the server, a computer program for the server and a non-transitory computer-readable medium storing computer-readable instructions for the server are also novel and useful. Moreover, a communication system comprising the above server and another device (e.g., a first communication device) is also novel and useful.

BRIEF DESCRIPTION OF THE DRAWINGS

FIG. 2 shows tables;
FIG. 8 shows a specific Case C2 realized by the processes of FIGS. 4 and 5;
FIG. 9 shows a specific Case C3 realized by the processes of FIGS. 4 and 5.

EMBODIMENTS

Figure 1:
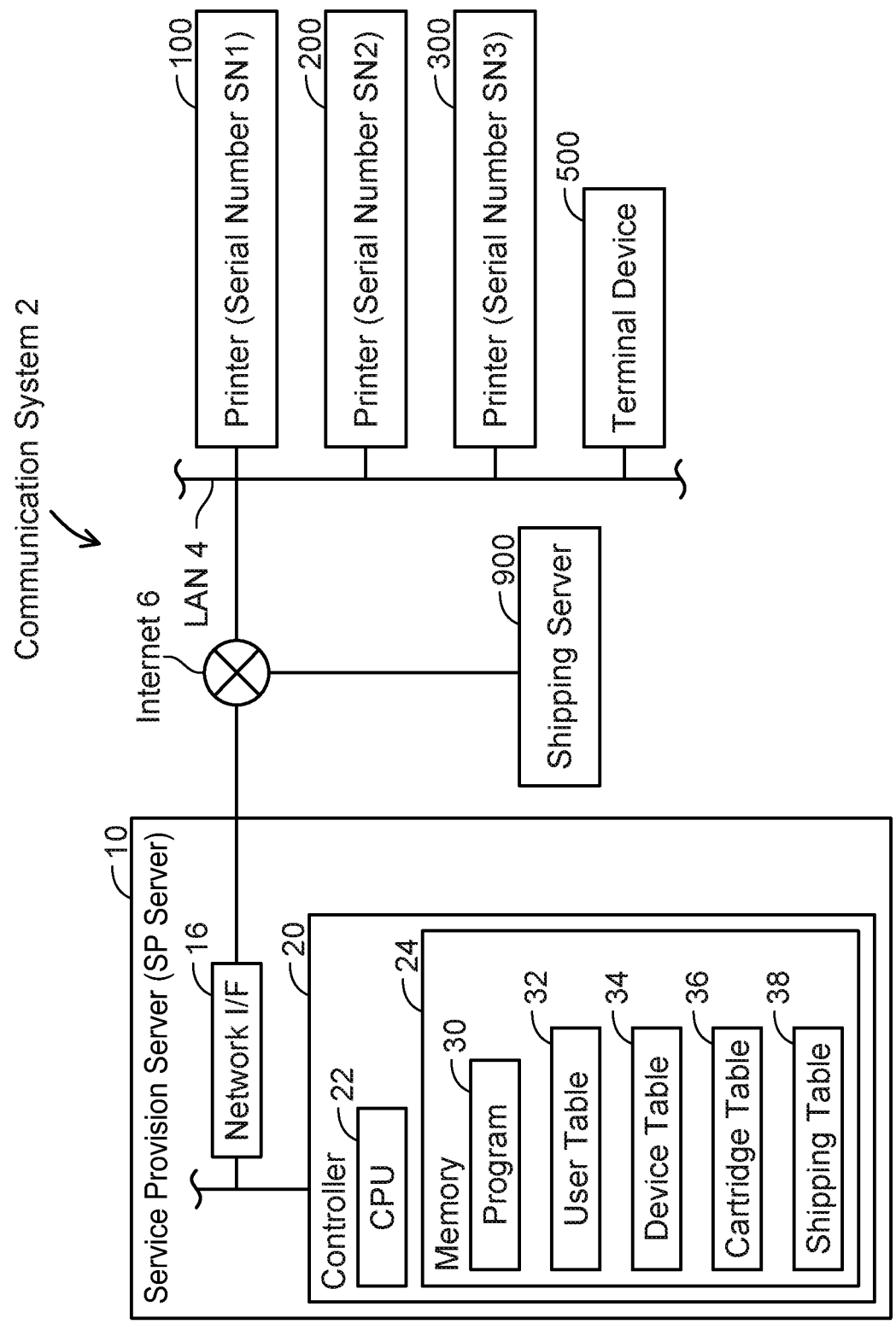
FIG. 1 shows a configuration of a communication system.

First Embodiment (Configuration of Communication System 2; FIG. 1)

As shown in FIG. 1, a communication system 2 includes a service provision server (hereinbelow termed "SP server") 10, three printers 100, 200, 300, a terminal device 500, and a shipping server 900. The printers 100 to 300 and the terminal device 500 are all connected to a Local Area Network (LAN) 4. The LAN 4 is connected to the Internet 6. The LAN 4 may be a wired LAN or a wireless LAN. The SP server 10 is capable of communicating with the respective devices 100 to 500 through the Internet 6. The SP server 10 is capable of communicating with the shipping server 900 through the Internet 6. The terminal device 500 is a terminal such as a desktop PC, a tablet PC, or a smartphone.

(Configurations of Printers 100 to 300)

Each of the printers 100 to 300 is a peripheral device (e.g., a peripheral device of the terminal device 500) provided with an inkjet print function. The printers 100 to 300 are of the same model, and are capable of having an ink cartridge of the same type (such as "BK01") mounted thereon. The printer 100 stores a serial number SN1 for identifying the printer 100. The printers 200, 300 store serial numbers SN2, SN3 likewise. In a variant, each of the printers 100 to 300 may be a peripheral device provided with a laser print function. In this case, the printers 100 to 300 are capable of having a toner cartridge of the same type mounted thereon.

(Configuration of Shipping Server 900)

The shipping server 900 is a server configured to be capable of executing a process of shipping an ink cartridge to a user of a printer. Specifically, when receiving an order signal from the SP server 10, the shipping server 900 executes a process for shipping a new ink cartridge to the user (such as notification to a worker) in accordance with the order signal. Here, the order signal indicates an instruction to ship the ink cartridge (that is, an order) and includes information by which an address of a recipient of the ink cartridge can be specified (such as a user name) The shipping server 900 is installed on the Internet 6 by a business entity different from a vendor of the printers 100, etc. In a variant, the shipping server 900 may be installed on the Internet 6 by the vendor.

(Configuration of SP Server 10)

The SP server 10 is a server configured to provide a service of shipping ink cartridges to users of the printers 100 to 300 by sending order signals to the shipping server 900. The SP server 10 is installed on the Internet 6 by the vendor of the printers 100, etc. In a variant, the SP server 10 may be installed on the Internet 6 by a business entity different from the vendor.

The SP server 10 is provided with a network interface 16 and a controller 20. These units 16, 20 are connected to a bus line (reference sign omitted). Hereinbelow, an interface will be termed "I/F". The network I/F 16 is an interface configured to execute communication through the Internet 6, and is connected to the Internet 6. The controller 20 is provided with a CPU 22 and a memory 24. The CPU 22 is configured to execute various processes in accordance with a program 30 stored in the memory 24. The memory 24 is constituted of a volatile memory, a nonvolatile memory and the like. Aside from the aforementioned program 30, the memory 24 further stores a user table 32, a device table 34, a cartridge table 36, and a shipping table 38. In a variant, those table 32 and the like may be stored in an external memory connected communicably with the SP server 10.

(Configurations of Tables; FIG. 2)

The user table 32 stores one or more pieces of user information. Each piece of the user information includes a user name (such as UN) for identifying a user, a password (such as PW), and address information (such as AD) indicating an address of the user. Further, the user table 32 may store each piece of the user information in association with a Personal Identification Number (PIN) code (such as "1234").

The device table 34 stores one or more pieces of device information. Each piece of the device information includes a user name (such as UN), a serial number (such as SN1), and an access token (such as AT1). The access token is authentication information used for communication between a printer (such as 100) and the SP server 10.

The cartridge table 36 stores one or more pieces of cartridge information. Each piece of the cartridge information includes a serial number (such as SN1), a type of ink cartridge (such as "BK01") capable of being mounted in the printer identified by the serial number, remaining amount information that indicates a remaining amount in the ink cartridge currently mounted on this printer, mounted time and date that indicates time and date when the ink cartridge currently mounted on the printer was initially mounted, and an order flag. The order flag indicates a value which is one of "ON" indicating that an order signal has been sent to the shipping server 900 and "OFF" indicating that an order signal has not been sent to the shipping server 900. By default, the order flag indicates "OFF".

The shipping table 38 stores one or more pieces of shipping information corresponding to one or more users who receive provision of a shipping service. Each piece of the shipping information includes a user name (such as UN), a type of ink cartridge (such as "BK01"), a shipped number indicating the number of shipped ink cartridges, an unmounted number indicating the number of ink cartridges that have not been mounted yet among the shipped ink cartridges, a shipping date and time that indicates time and date when the ink cartridges were shipped, and a notification flag. The notification flag indicates a value which is one of "ON" indicating that a notification process to be described later (see FIG. 5) is to be executed and "OFF" indicating that the notification process is not to be executed. The notification flag indicates "OFF" by default. In a case where the SP server 10 acquires a shipped number and a shipping date and time from the shipping server, the shipped number, an unmounted number, and the shipping date and time are stored in the shipping table 38.

Figure 3:
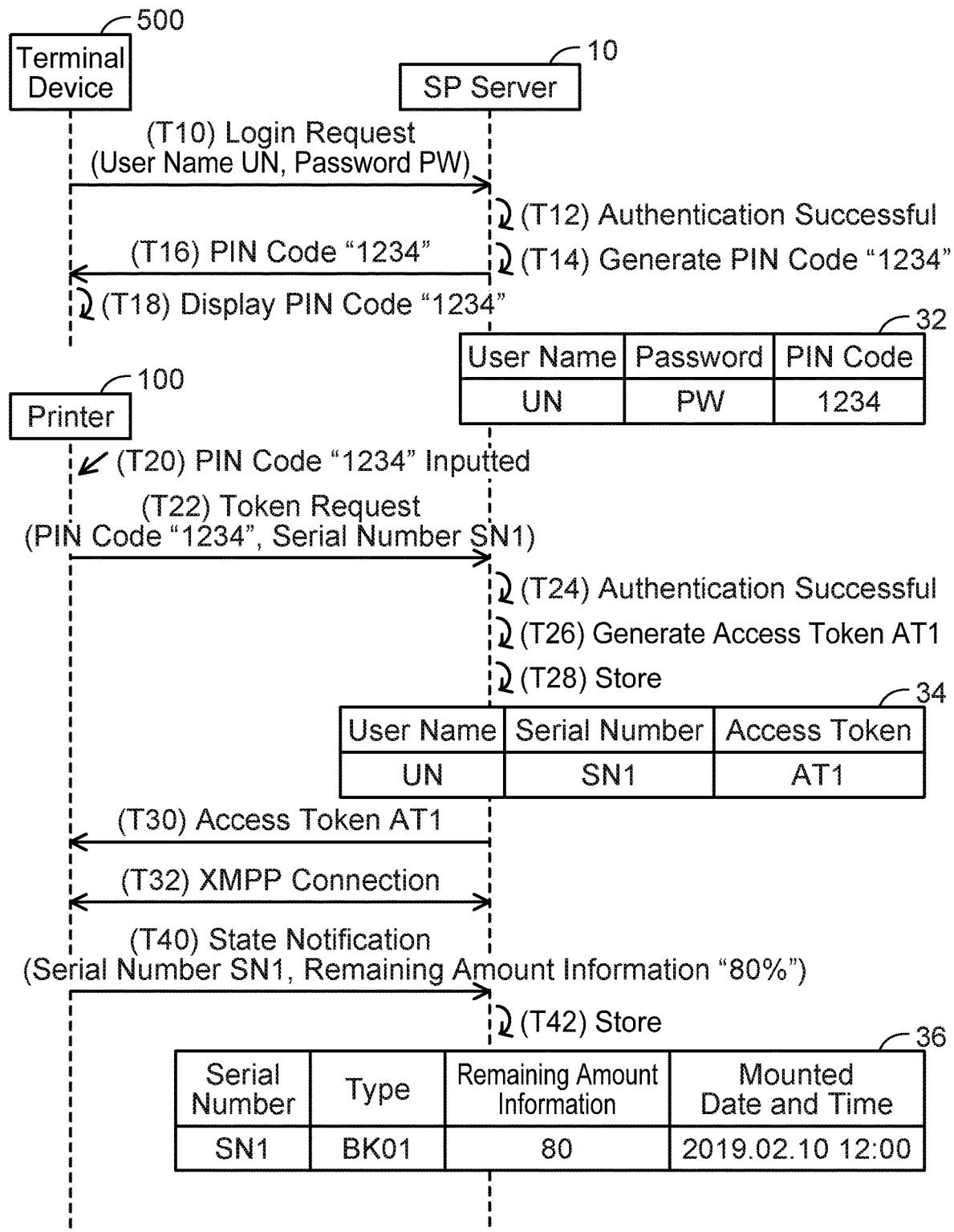
FIG. 3 shows a sequence diagram of processes of storing device information and remaining amount information.

(Processes of Storing Information in Tables 34, 36; FIG. 3)

A process of storing the device information in the device table 34 and a process of storing the remaining amount information in the cartridge table 36 will be described with reference to FIG. 3. Hereinbelow, from easier understanding, processes executed by respective CPUs of the respective devices 10, etc. (such as the CPU 22 of the SP server 10) may be described with the respective devices (such as the SP server 10) as subjects of action, instead of the respective CPUs as subjects of action.

In an initial state of FIG. 3, the user table 32 has already stored user information including a user name UN and a password PW (see FIG. 2). This user information is stored in the SP server 10 by the user using the terminal device 500.

When accepting an operation of designating a URL of the SP server 10 and an input operation of the user name UN and the password PW from the user, the terminal device 500 sends a login request including the user name UN and the password PW to the SP server 10 in T10.

When receiving the login request from the terminal device 500 in T10, the SP server 10 determines that authentication is successful in T12 since the combination of the user name UN and the password PW included in the login request is already stored in the user table 32. In this case, the SP server 10 generates a PIN code "1234" and stores the PIN code "1234" in association with the logged-in user name UN in T14, and sends the PIN code "1234" to the terminal device 500 in T16.

When receiving the PIN code "1234" from the SP server 10 in T16, the terminal device 500 displays the PIN code "1234" in T18. Due to this, the user can acknowledge the PIN code "1234".

Next, when accepting an input of the PIN code "1234" from the user in T20, the printer 100 sends a token request to the SP server 10 in T22. The token request is a command that requests the SP server 10 to send an access token, and includes the PIN code "1234" and the serial number SN1 of the printer 100.

When receiving the token request from the printer 100 in T22, the SP server 10 executes authentication of the PIN code "1234" included in the token request in T24. In the present case, the PIN code "1234" included in the token request matches the PIN code "1234" in the user table 32, thus the SP server 10 determines that the authentication of the PIN code is successful. Then in T26, the SP server 10 generates an access token AT1.

In T28, the SP server 10 stores device information including the user name associated with the PIN code "1234", the serial number SN1 included in the token request, and the generated access token AT1 in the device table 34. In T30, the SP server 10 sends the access token AT1 to the printer 100.

When receiving the access token AT1 from the SP server 10 in T30, the printer 100 establishes an Extensible Messaging and Presence Protocol (XMPP) connection between the printer 100 and the SP server 10 by using the access token AT1 in T32. The XMPP connection is a so-called full-time connection, and continues to be established until power of the printer 100 is turned off. By using the XMPP connection, the SP server 10 can pass through a firewall of the LAN 4 to which the printer 100 is connected and send a request to the printer 100, without receiving a request from the printer 100. A mechanism for sending a request from the SP server 10 to the printer may not be the XMPP connection, and another mechanism may be used. For example, a Hypertext Transfer Protocol Secure (HTTPS) connection may be established between the printer 100 and the SP server 10.

When completing the establishment of the XMPP connection, the printer 100 sends a state notification, which is for notifying the SP server 10 of information related to a state of the printer 100, to the SP server 10 in T40. The state notification includes the serial number SN1 and remaining amount information (such as "80%") that indicates a remaining amount of ink in the ink cartridge that is currently mounted on the printer 100. The printer 100 sends the state notification periodically (e.g., every one hour) to the SP server 10.

When receiving the state notification from the printer 100 in T40, the SP server 10 stores the remaining amount information included in the state notification in the cartridge table 36 in association with the serial number SN1 included in the state notification in T42. At this point of time, the remaining amount information indicates 80% which is equal to or greater than a predetermined threshold (such as 20%), thus the SP server 10 does not send an order signal to the shipping server 900.

Figure 4:
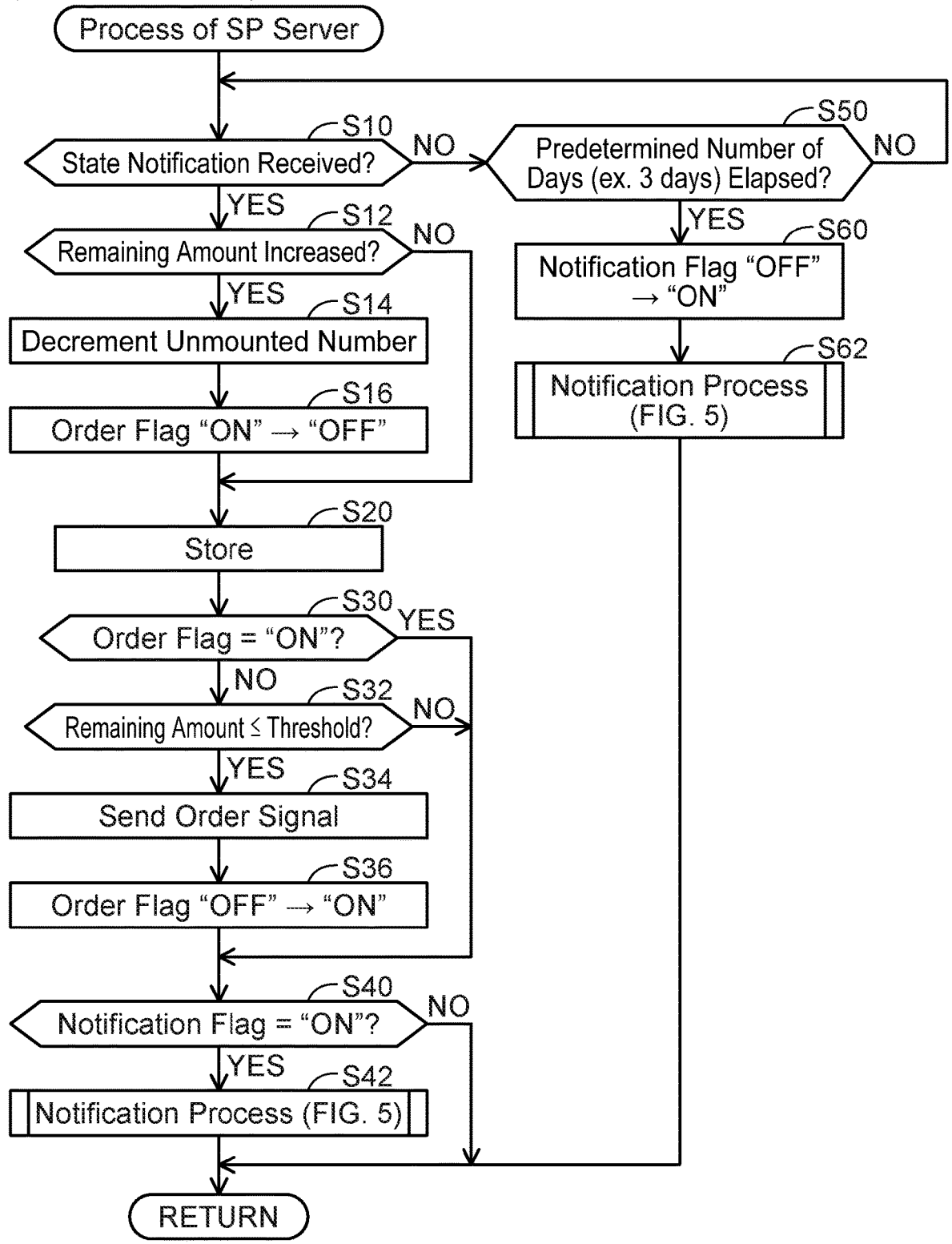
FIG. 4 shows a flowchart of a process executed by a service provision server of a first embodiment.

(Processes of SP Server; FIG. 4)

A process executed by the CPU 22 of the SP server 10 will be described with reference to FIG. 4. This process is started with power of the SP server 10 being turned on as a trigger.

The CPU 22 monitors whether a state notification is received from a printer (such as 100) in S10, and it also monitors whether a predetermined number of days (such as 3 days) has elapsed from any one of shipping dates and times in the shipping table 38. The CPU 22 proceeds to S12 in a case where a state notification is received from a printer (YES in S10), and it proceeds to S60 in a case where the predetermined number of days has elapsed from any one of the shipping dates and times (YES in S50).

In S12, the CPU 22 determines whether or not a remaining amount indicated by remaining amount information in the received state notification has increased from the remaining amount indicated by the remaining amount information in the cartridge table 36 that is associated with a serial number included in the received state notification. In a case of determining that the remaining amount has increased (YES in S12), the CPU 22 determines that the ink cartridge in the printer identified by the serial number included in the state notification has been exchanged, and proceeds to S14. On the other hand, in a case of determining that the remaining amount has not increased (NO in S12), the CPU 22 skips processes of S14 and S16 and proceeds to S20.

In S14, the CPU 22 decrements the unmounted number associated with the serial number in the state notification in the device table 34 and in the shipping table 38. Then, in S16, the CPU 22 changes the order flag associated with the serial number in the state notification from "ON" to "OFF" in the cartridge table 36.

Then, in S20, the CPU 22 stores the remaining amount information included in the state notification in the cartridge table 36 in association with the serial number SN1 included in the state notification. The process of T42 of FIG. 3 is realized by the process of S20.

Then, in S30, the CPU 22 determines whether or not the order flag associated with the serial number included in the state notification in the cartridge table 36 indicates "ON". In a case of determining that the order flag indicates "ON" (YES in S30), the CPU 22 determines that an ink cartridge to be mounted on the printer identified by the serial number in the state notification has already been shipped, skips processes of S32 to S36 to be described later, and proceeds to S40. On the other hand, in a case of determining that the order flag indicates "OFF" (NO in S30), the CPU 22 proceeds to S32 to determine whether to ship an ink cartridge.

In S32, the CPU 22 determines whether or not the remaining amount indicated by the remaining amount information associated with the serial number in the state notification in the cartridge table 36 is equal to or less than the predetermined threshold (such as 20%). The CPU 22 proceeds to S34 in a case of determining that the remaining amount is equal to or less than the predetermined threshold (YES in S32), while it skips the processes of S34 and S36 and proceeds to S40 in a case of determining that the remaining amount is greater than the predetermined threshold (NO in S32). A condition on which whether the process of S34 is executed or not is determined is not limited to the condition that the ink remaining amount is equal to or less than the threshold, but may include other conditions (such as a condition that an amount of change in the remaining amount calculated from a history of the remaining amount information is equal to or greater than a predetermined value).

In S34, the CPU 22 sends an order signal, which is for ordering an ink cartridge of the type that is associated with the serial number in the state notification in the cartridge table 36, to the shipping server 900. Then, in S36, the CPU 22 changes the order flag associated with the serial number in the state notification from "OFF" to "ON" in the cartridge table 36.

Then, in S40, the CPU 22 determines whether or not the notification flag associated with the serial number in the state notification indicates "ON" in the device table 34 and in the shipping table 38. The CPU 22 executes a notification process to be described later (see FIG. 5) in S42 in a case of determining that the notification flag indicates "ON" (YES in S40), while it skips S42 and returns to the monitoring in S10 and S50 in a case of determining that the notification flag indicates "OFF" (NO in S40).

In the case where the predetermined number of days (such as 3 days) has elapsed from any one of the shipping dates and times in the shipping table 38 (YES in S50), the CPU 22 changes the notification flag associated with this shipping date and time from "OFF" to "ON" in S60. Here, the predetermined number of days is determined in advance based on a number of days required for an ink cartridge to arrive at the user from when the shipping server 900 shipped the ink cartridge. Then, in S62, the CPU 22 executes the notification process (see FIG. 5). When S62 is completed, the CPU 22 returns to the monitoring in S10 and S50.

Figure 5:
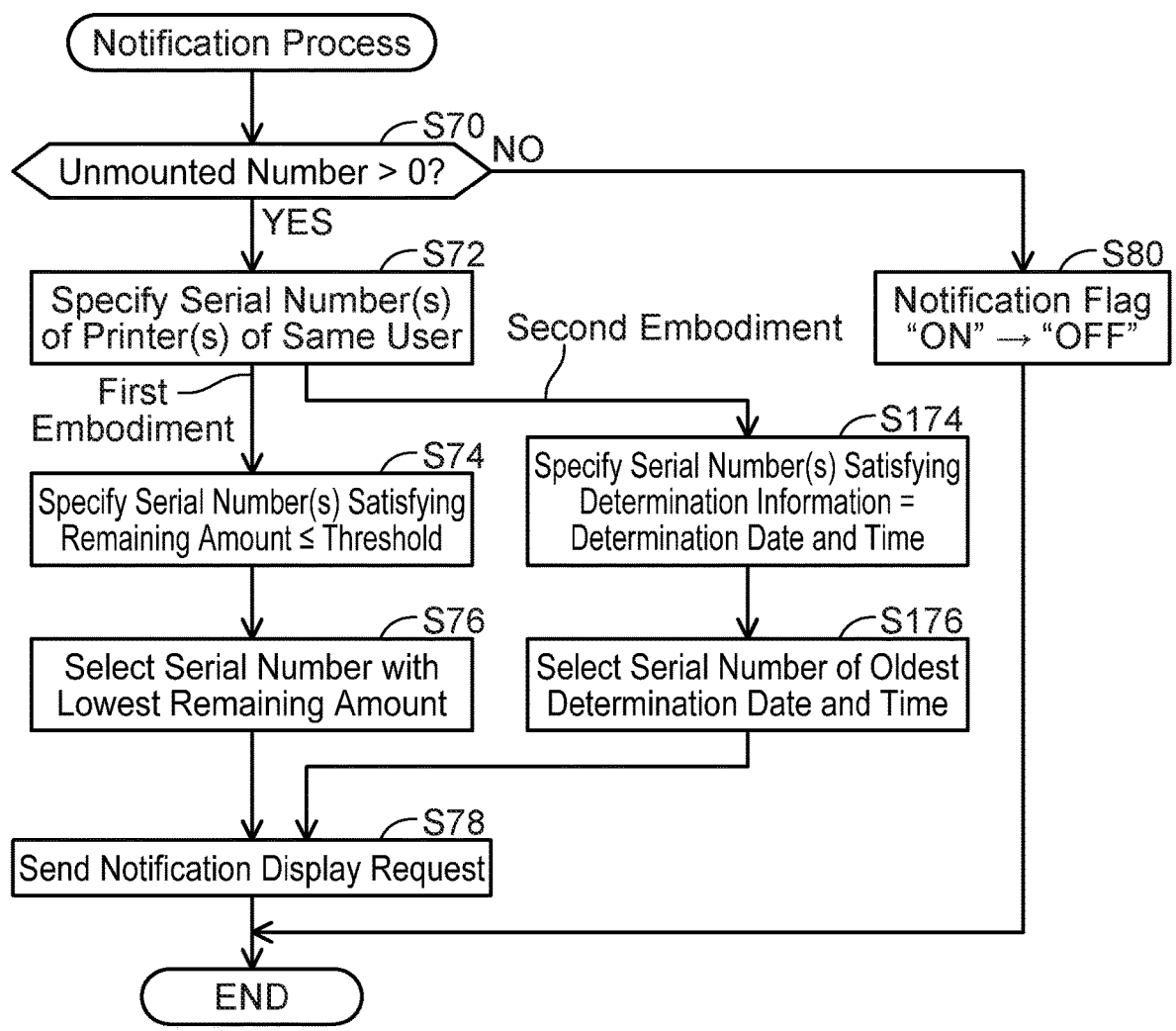
FIG. 5 shows a flowchart of a notification process.

(Notification Process; FIG. 5)

The notification process (see S42 and S62 of FIG. 4) will be described with reference to FIG. 5. In S70, the CPU 22 determines whether or not a target unmounted number is greater than zero. Here, in the case where the notification process is executed as S42 of FIG. 4, the target unmounted number is the unmounted number associated with the serial number included in the state notification in the device table 34 and in the shipping table 38, while in the case where the notification process is executed as S62 of FIG. 4, the target unmounted number is the unmounted number associated with the shipping date and time from which the predetermined number of days have elapsed in the shipping table 38. The CPU 22 proceeds to S72 in a case of determining that the target unmounted number is greater than zero (YES in S70). On the other hand, the CPU 22 proceeds to S80 in a case of determining that the target unmounted number is zero (NO in S70). In S80, the CPU 22 changes the notification flag associated with the target unmounted number in the shipping table 38 from "ON" to "OFF". When S80 is completed, the process of FIG. 5 ends.

In S72, the CPU 22 specifies the user name associated with the target unmounted number from the shipping table 38, and specifies K1 serial numbers associated with the same specified user name from the device table 34 (that is, K1 pieces of serial numbers of K1 printers which the same user uses). Here, K1 is an integer satisfying 1≤K1.

In S74, the CPU 22 specifies K1 pieces of remaining amount information associated with the specified K1 serial numbers from the cartridge table 36. Then, the CPU 22 specifies K2 pieces of remaining amount information each indicating the remaining amount equal to or less than the predetermined threshold from among the K1 pieces of remaining amount information. As a result, the CPU 22 specifies K2 serial numbers associated with the K2 pieces of remaining amount information. Here, K2 is an integer satisfying 1≤K2≤K1.

In S76, the CPU 22 selects, from among the specified K2 serial numbers, a target serial number that is associated with target remaining amount information indicating the lowest remaining amount among the K2 pieces of remaining amount information.

In S78, the CPU 22 sends a notification display request to a target printer identified by the target serial number. The notification display request is a command that requests the target printer to display a notification screen indicating that the ink cartridge of the target printer should be exchanged. The notification display request is sent to the target printer using the XMPP connection (see T32 of FIG. 3). When S78 is completed, the process of FIG. 5 ends.

Figure 6:
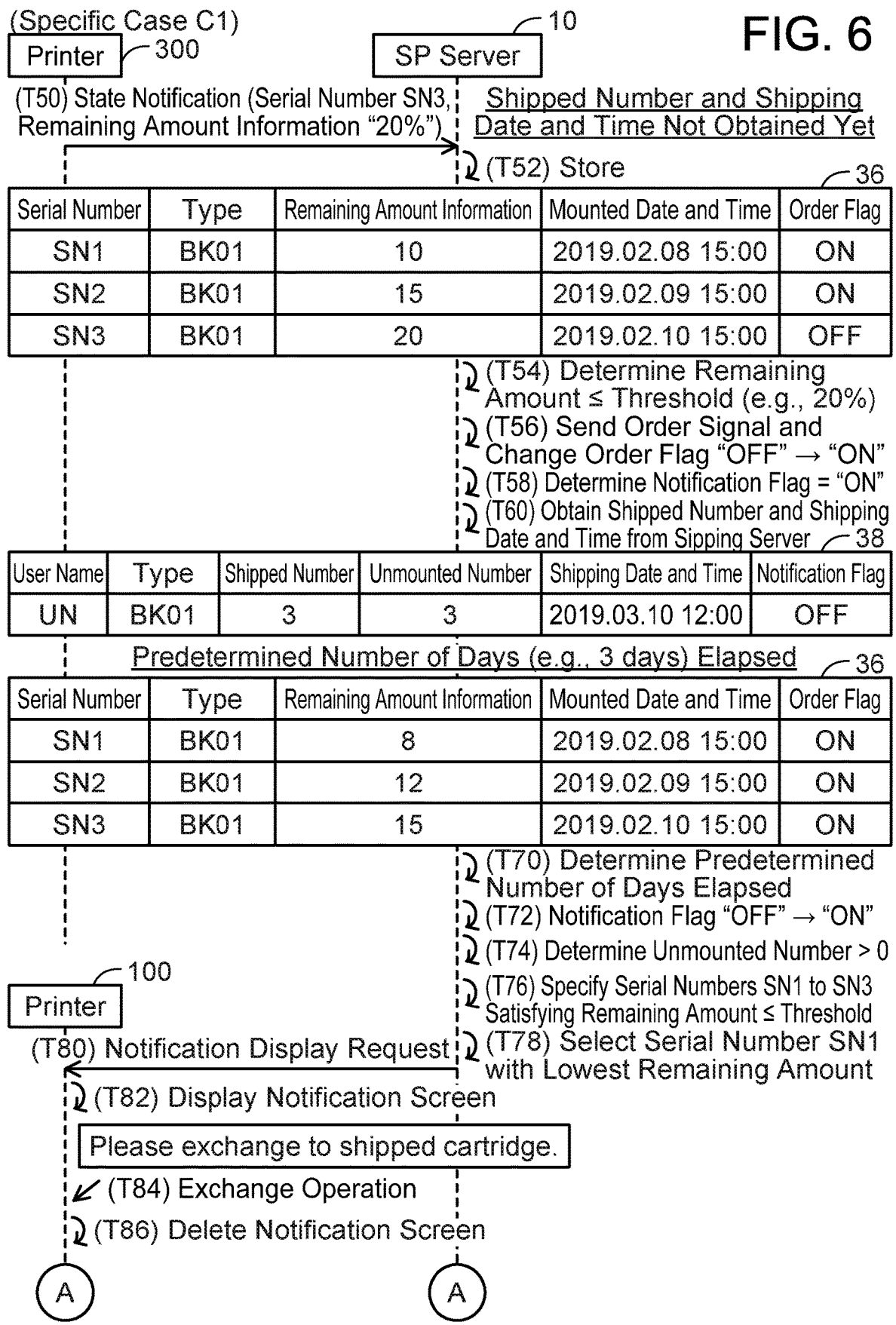
FIG. 6 shows a specific Case C1 realized by the processes of FIGS. 4 and 5.
Figure 7:
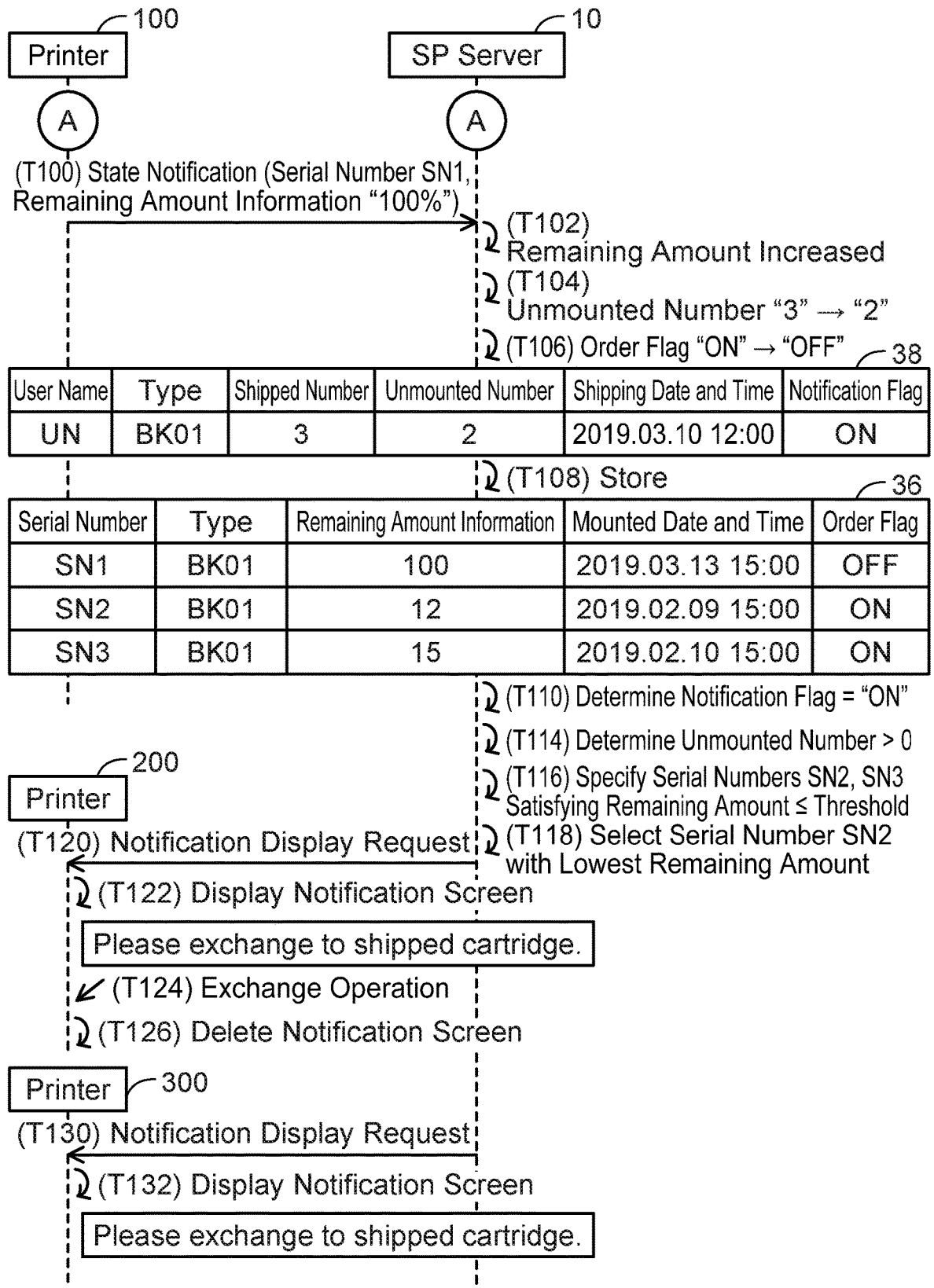
FIG. 7 shows a continuation of FIG. 6.

(Specific Case C1; FIGS. 6 and 7)

A specific Case C1 realized by the processes of FIGS. 4 and 5 will be described with reference to FIGS. 6 and 7. In an initial state of this Case C1, both of the order flags corresponding to the serial numbers SN1, SN2 indicate "ON" and the order flag corresponding to the serial number SN3 indicates "OFF" in the cartridge table 36. That is, the SP server 10 has already sent an order signal to the shipping server 900 in response to having received a state notification from the printer 100, and also has already sent an order signal to the shipping server 900 in response to having received a state notification from the printer 200. Here, although the SP server 10 has already sent the above two order signals to the shipping server 900, it has not yet acquired the shipped numbers and the shipping times and dates from the shipping server 900 since the shipping server 900 has not yet executed shipping of the ink cartridges. Due to this, at this point of time, the shipping table 38 has not yet stored the shipped numbers, the unmounted numbers, nor the shipping dates and times, and the notification flag indicates "OFF".

The SP server 10 receives a state notification that includes the serial number SN3 and remaining amount information indicating the remaining amount "20%" from the printer 300 in T50 (YES in S10 of FIG. 4).

In the present case, at this point of time, the remaining amount indicated by the remaining amount information in the cartridge table 36 is greater than "20%". Due to this, in T52, the SP server 10 determines that the remaining amount has not increased (NO in S12) and stores the remaining amount information included in the state notification in the cartridge table 36 (S20).

In T54, the SP server 10 determines that the order flag associated with the serial number SN3 indicates "OFF" (NO in S30) and further determines that the remaining amount information associated with the serial number SN3 is equal to or less than the predetermined threshold "20%" (YES in S32).

In T56, the SP server 10 sends, to the shipping server 900, an order signal for ordering an ink cartridge of the type "BK01" associated with the serial number SN3 in the cartridge table 36 (S34). Then, the SP server 10 changes the order flag associated with the serial number SN3 from "OFF" to "ON" (S36).

In T58, the SP server 10 determines that the notification flag associated with the serial number SN3 indicates "OFF" (YES in S40). As a result of this, at this point of time, the notification process is not executed.

Then in T60, the SP server 10 acquires, from the shipping server 900, a shipped number "3", shipping date and time "2019.3.10 12:00", and information by which the user name can be specified. The shipped number "3" means that three ink cartridges of "BK01" were shipped according to the three order signals sent to the shipping server 900 from the SP server 10. Then, the SP server 10 estimates an unmounted number "3" from the shipped number "3", and stores the shipped number "3", the unmounted number "3", and the shipping date and time "2019.3.10 12:00" in the shipping table 38. At this point of time, the notification flag indicates "OFF".

Next, the SP server 10 determines in T70 that the predetermined number of days (such as 3 days) has elapsed from the shipping date and time "2019.3.10 12:00" in the shipping table 38 (YES in S50 of FIG. 4). Since state notifications were received from the respective printers 100 to 300 by the time when the predetermined days (such as 3 days) has elapsed from the shipping date and time "2019.3.10 12:00", the remaining amounts indicated by the remaining amount information in the cartridge table decreased accordingly.

In T72, the SP server 10 changes the notification flag associated with the shipping date and time "2019.3.10 12:00" from "OFF" to "ON" (S60).

In T74, the SP server 10 determines that the unmounted number "3" associated with the shipping date and time "2019.3.10 12:00" is greater than zero (YES in S70 of FIG. 5).

In T76, the SP server 10 specifies the three serial numbers SN1 to SN3 associated with the remaining amounts equal to or less than the predetermined threshold (that is, "20%") (S74).

In T78, the SP server 10 selects, from among the three serial numbers SN1 to SN3, the serial number SN1 associated with the remaining amount information indicating the lowest remaining amount "8%" (S76).

In T80, the SP server 10 sends a notification display request to the printer 100 identified by the serial number SN1 (S78).

When receiving the notification display request from the SP server 10 in T80, the printer 100 displays a notification screen in T82. The notification screen includes a message indicating that the ink cartridge should be exchanged.

At this point of time, the three ink cartridges of "BK01" have already arrived at the user. In T84, the user sees the notification screen, and mounts one of the three cartridges on the printer 100 (that is, the user exchanges the ink cartridges of the printer 100). When the ink cartridge is exchanged, the printer 100 deletes the notification screen in T86.

Next, as shown in FIG. 7, when the ink cartridge is exchanged, the printer 100 sends, to the SP server 10 in T100, a state notification that includes the serial number SN1 and remaining amount information indicating remaining amount "100%".

When receiving the state notification from the printer 100 in T100, the SP server 10 determines in T102 that the remaining amount "100%" indicated by the remaining amount information in the state notification has increased from the remaining amount "8%" indicated by the remaining amount information in the cartridge table 36 (YES in S12 of FIG. 4).

In T104, the SP server 10 decrements the unmounted number "3" associated with the serial number SN1 (S14). As a result, the unmounted number becomes "2".

In T106, the SP server 10 changes the order flag associated with the serial number SN1 from "ON" to "OFF" (S16).

In T108, the SP server 10 stores the remaining amount information included in the state notification in the cartridge table 36 (S20). At this point of time, an order signal is not sent to the shipping server 900 since the order flag associated with the serial number SN1 indicates "OFF" (NO in S30) and the remaining amount information associated with the serial number SN1 indicates the remaining amount "100%" (NO in S32).

In T110, the SP server 10 determines that the notification flag associated with the serial number SN1 indicates "ON" (YES in S40).

In T114, the SP server 10 determines that the unmounted number "2" associated with the serial number SN1 is greater than zero (YES in S70 of FIG. 5).

In T116, the SP server 10 specifies the two serial numbers SN2, SN3 associated with the remaining amounts that are equal to or less than the predetermined threshold (that is, "20%") (S74).

In T118, the SP server 10 selects, from among the two serial numbers SN2 and SN3, the serial number SN2 that is associated with the remaining amount information indicating the lowest remaining amount "12%" (S76).

In T120, the SP server 10 sends a notification display request to the printer 200 identified by the serial number SN2 (S78). T122 to T126 are the same as T82 to T86 of FIG. 6 except that the printer in which the notification screen is displayed is the printer 200.

When the ink cartridge is exchanged in the printer 200, the same processes as T100 to T118 are executed for the printer 200 as well. As a result, a notification display request is sent to the printer 300 in T130, and the notification screen is displayed in the printer 300 in T132.

According to the present case, the notification screen is first displayed in the printer 100 with the least remaining amount among the three printers (T82 of FIG. 6), and the ink cartridge of the printer 100 is exchanged (T84). Then, the notification screen is displayed in the printer 200 with the second least remaining amount among the three printers (T122 of FIG. 7), and the ink cartridge of the printer 200 is exchanged (T124). Then finally, the notification screen is displayed in the printer 300 with the third least remaining amount among the three printers (T132 of FIG. 7). According to the present case, the user can sequentially exchange the ink cartridges in ascending order of remaining amount.

(Specific Case C2; FIG. 8)

A specific Case C2 realized by the processes of FIGS. 4 and 5 will be described with reference to FIG. 8. In an initial state of this Case C2, the order flag corresponding to the serial number SN1 in the cartridge table 36 indicates "ON" and the order flags corresponding to the serial numbers SN2, SN3 indicate "OFF". That is, the SP server 10 has already sent an order signal to the shipping server 900 in response to having received a state notification from the printer 100. At this point of time, the SP server 10 has not yet acquired a shipped number and shipping date and time from the shipping server 900. Due to this, at this point of time, the shipping table 38 has not stored a shipped number, an unmounted number, nor shipping date and time, and the notification flag indicates "OFF". Further, in the cartridge table 36, the remaining amount information corresponding to the serial number SN3 indicates the remaining amount "80%".

T150 is the same as T50 of FIG. 6 except that the state notification is received from the printer 200. T152 is the same as T52 of FIG. 6 except that the remaining amount information in the state notification is stored in association with the serial number SN2. Then, the same processes as T54 to T58 of FIG. 5 are executed for the printer 200 (that is, the serial number SN2). As a result, the order flag corresponding to the serial number SN2 is set to "ON" in response to the order signal having been sent.

Then, in T160, the SP server 10 acquires a shipped number "1" and shipping date and time "2019.3.10 12:00" from the shipping server 900. As described above, the SP server 10 has already sent the order signals for the printers 100, 200 to the shipping server 900. However, due to stock shortage of the ink cartridges, the shipping server 900 has shipped only one ink cartridge of "BK01". The above shipped number "1" means that only one ink cartridge has been shipped as a result of two ink cartridges having been ordered. Then, the SP server 10 estimates an unmounted number "1" from the shipped number "1", and stores the shipped number "1", the unmounted number "1", and the shipping date and time "2019.3.10 12:00" in the shipping table 38. At this point of time, the notification flag indicates "OFF".

Then, the SP server 10 determines that the predetermined number of days (such as 3 days) has elapsed from the shipping date and time "2019.3.10 12:00" as in T70 of FIG. 6, and executes the same processes as T72 to T74 as in FIG. 6.

In T176, the SP server 10 specifies the two serial numbers SN1, SN2 associated with the remaining amounts that are equal to or less than the predetermined threshold (that is, "20%") (S74).

In T178, the SP server 10 selects, from among the two serial numbers SN1 and SN2, the serial number SN1 associated with the remaining amount information indicating the lowest remaining amount "12%" (S76).

T180 to T184 are the same as T80 to T84 of FIG. 6. T200 and T202 are the same as T100 and T102 of FIG. 7.

In T204, the SP server 10 decrements the unmounted number "1" associated with the serial number SN1 (S14). As a result, the unmounted number becomes "0". T206 to T210 are the same as T106 to T110 of FIG. 7.

In T212, the SP server 10 determines that the mounted number "0" associated with the serial number SN1 is zero (NO in S70 of FIG. 5).

In T214, the SP server 10 changes the notification flag associated with the serial number SN1 in the state notification from "ON" to "OFF" (S80).

According to the present case, only one ink cartridge is shipped as the result of two ink cartridges having been ordered. Consequently, only one ink cartridge arrives at the user despite a situation where the ink cartridges in the two printers 100, 200 should be exchanged. In such a situation, the SP server 10 stores the shipped number "1" acquired from the shipping server 900 as the unmounted number "1" (T160), and decrements the unmounted number "1" (T204) in a case of receiving the state notification that includes the remaining amount information indicating the remaining amount "100%" from the printer 100 (T200). Then, the SP server 10 determines that the unmounted number "0" is zero (T212) and does not send a notification display request to the printer 200. Such a configuration can prevent the notification screen from being displayed in the printer 200 in the situation where the ink cartridge that should be mounted on the printer 200 does not arrive at the user.

(Specific Case C3; FIG. 9)

A specific Case C3 realized by the processes of FIGS. 4 and 5 will be described with reference to FIG. 9. An initial state of this Case C3 is the same as the initial state of Case C1 of FIG. 6. The same processes as T50 to T60 of FIG. 6 are executed.

In present Case C3, three ink cartridges of "BK01" arrive at the user before the predetermined number of days (such as 3 days) elapse from the shipping date and time "2019.3.10 12:00". In T240, the user mounts one of the three ink cartridges on the printer 100.

When the ink cartridge is exchanged, the printer 100 sends, to the SP server 10 in T250, a state notification that includes the serial number SN1 and the remaining amount information indicating the remaining amount "100%". T252 to T258 are the same as T102 to T108 of FIG. 7.

In T260, the SP server 10 determines that the notification flag associated with the serial number SN1 indicates "OFF" (NO in S40 of FIG. 4). As a result, a notification display request is not sent at this point of time.

T270 to T274 are the same as T70 to T74 of FIG. 6. In T276, the SP server 10 specifies two serial numbers SN2, SN3 with the remaining amounts that are equal to or less than the predetermined threshold (that is, "20%") (S74). In T278, the SP server 10 selects, from among the two serial numbers SN2 and SN3, the serial number SN2 associated with the remaining amount information indicating the lowest remaining amount "12%" (S76). In T280, the SP server 10 sends a notification display request to the printer 200 identified by the serial number SN2 (S78).

When receiving the notification display request from the SP server 10 in T280, the printer 200 displays the notification screen in T282.

According to the present case, display of the notification screen can be prevented in the printer 100 in which the ink cartridge had already been exchanged, in the situation where the ink cartridges can be exchanged earlier than planned.

Effect of Embodiment

According to the configuration of the present embodiment, after having sent to the shipping server 900 three order signals for shipping three ink cartridges to the user, the SP server 10 uses three pieces of remaining amount information in which the remaining amounts are equal to or less than the predetermined threshold (that is, the three pieces of remaining amount information corresponding to the three serial numbers SN1 to SN3) to select, from among the three serial numbers SN1 to SN3, the serial number SN1 associated with the remaining amount information indicating the lowest remaining amount "8%" among the three pieces of remaining amount information (T78 of FIG. 6). Then, the SP server 10 sends the notification display request to the printer 100 identified by the serial number SN1 (T80). As a result, the printer 100 displays the notification screen indicating that the ink cartridge should be exchanged (T82). Thus, the user can easily find the printer 100 of which ink cartridge should be exchanged from among the three printers 100 to 300.

Further, in the case where the predetermined number of days has elapsed from the shipping date and time (YES in S50), the SP server 10 executes the notification process (S62). According to such a configuration, the notification screen can be displayed on the date and time when the ink cartridge is expected to arrive at the user.

(Corresponding Relationships)

The SP server 10, the memory 24, and the ink cartridge are respectively examples of "server", "memory", and "consumable article". The three printers 100 to 300 are an example of "N devices". The serial number and the remaining amount information are respectively examples of "device identification information" and "consumable article information". The remaining amount being equal to or less than the predetermined threshold is an example of "consumable article exchange condition". The process of S34 of FIG. 4 that sends the order signal is an example of "shipping process". The notification display request is an example of "first notification execution request (and second notification execution request)". The process of displaying the notification screen is an example of "first notification process (second notification process)". The predetermined number of days in S50 of FIG. 4 is an example of "predetermined time".

In regard to Case C1 (FIGS. 6 and 7) and Case C2 (FIG. 8), the printer 100 and the serial number SN1 are respectively examples of "first device (and external device)" and "first device identification information". In regard to Case C1, the three pieces of remaining amount information in T76 of FIG. 6 are an example of "N1 pieces of the consumable article information (and N2 pieces of the consumable article information)". The remaining amount information "100%" in T100 of FIG. 7 is an example of "exchange information". The printer 200 and the serial number SN2 are respectively examples of "second device" and "second device identification information". Further, in regard to Case C2, the two pieces of remaining amount information in T116 of FIG. 8 are an example of "N1 pieces of the consumable article information (and N2 pieces of the consumable article information)". The remaining amount information "100%" in T200 of FIG. 8 is an example of "exchange information".

In regard to Case C3 (FIG. 9), the printer 100 and the remaining amount information "100%" in T250 are respectively examples of "third device" and "exchange information". The printer 200 and the serial number SN2 are respectively examples of "first device (and external device)" and the "first device identification information". The three pieces of remaining amount information corresponding to the shipped number "3" are an example of "N1 pieces of the consumable article information". The two pieces of remaining amount information in T276 are an example of "N2 pieces of the consumable article information".

S10, S20, and S34 of FIG. 4 are respectively examples of "receive device identification information", "store each of the N pieces of the device identification information", and "execute a shipping process". S74 and S76 of FIG. 5 are an example of "select first device identification information". S78 is an example of "send a first notification execution request".

Second Embodiment

This embodiment primarily differs from the first embodiment in the condition for sending an order signal. As such, contents of the process by the SP server 10 differ from those of the first embodiment.

In the present embodiment, a printer (such as 100) sends a state notification including determination information to the SP server 10 (see T40 of FIG. 3) instead of sending the state notification including the remaining amount information. Further, the cartridge table 36 stores the determination information (see FIG. 2) instead of the remaining amount information. Here, the "determination information" indicates a determination date and time when the printer, which is the sender of the state notification, determined that the ink cartridge currently mounted on this sender printer should be exchanged, in a case where this determination was made. On the other hand, in a case where the sender printer does not determine that the ink cartridge should be exchanged, the "determination information" indicates empty information (e.g. Null value). Specifically, the "determination information" indicates the determination date and time during a period from when the sender printer determined that the ink cartridge should be exchanged until when the ink cartridge is actually exchanged, while it indicates the empty information during a period from when the ink cartridge was actually exchanged until when the sender printer determines again that the ink cartridge should be exchanged. The sender printer determines that the ink cartridge should be exchanged in a case where a remaining amount of the ink cartridge is equal to or less than a predetermined threshold (such as 20%), for example.

Figure 10:
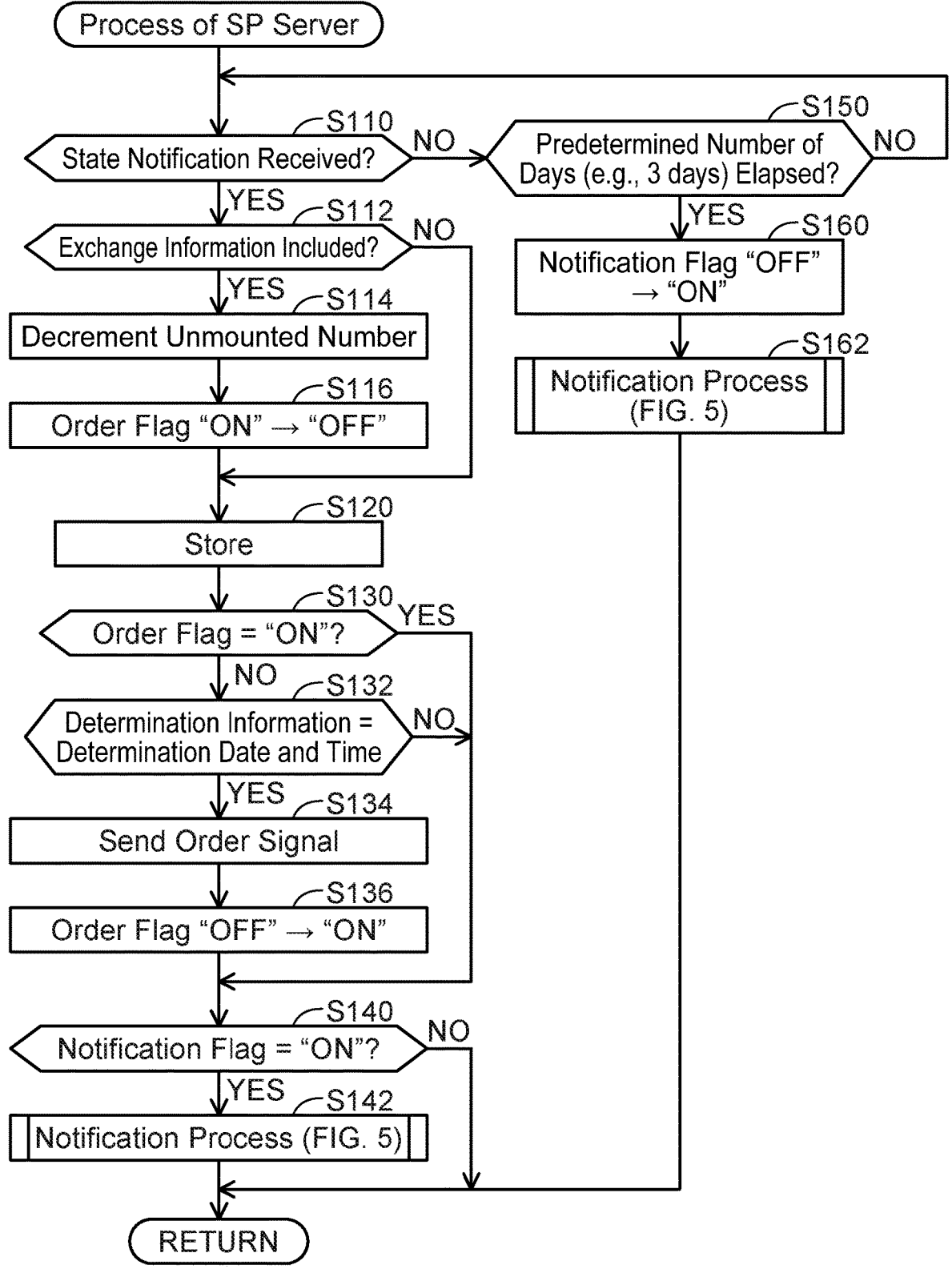
FIG. 10 shows a flowchart of a process executed by a service provision server of a second embodiment.

(Process of SP server; FIG. 10)

A process by the SP server 10 of the present embodiment will be described with reference to FIGS. 10. S110, S150, and S160 are the same as S10, S50, and S52 of FIG. 4. S162 is the same as S62 except that contents of the notification process are different.

In a case of receiving a state notification from a printer (YES in S110), the CPU 22 of the SP server 10 determines in S112 whether or not exchange information is included in the received state notification. The exchange information is information indicating that an ink cartridge has been exchanged in the sender printer of the state notification. The CPU 22 proceeds to S114 in a case of determining that the state notification includes the exchange information (YES in S112), while it skips processes of S114 to S116 and proceeds to S120 in a case of determining that the state notification does not include the exchange information (NO in S112).

S114 and S116 are the same as S14 and S16 of FIG. 4. S120 is the same as S20 of FIG. 4 except that the determination information in the state notification is stored in the cartridge table. S130 is the same as S30 of FIG. 4.

In S132, the CPU 22 determines whether or not the determination information associated with the serial number in the state notification indicates the determination date and time. The CPU 22 proceeds to S134 in a case of determining that the determination information indicates the determination date and time (YES in S132), while it skips S134 and S136 and proceeds to S140 in a case of determining that the determination information indicates the empty information (NO in S132).

S134 to S140 are the same as S36 to S40 of FIG. 4. S142 is the same as S42 except that the contents of the notification process are different.

(Notification Process; FIG. 5)

The notification process of the present embodiment will be described with reference to FIG. 5. In this embodiment, processes of S174 and S176 are executed after the process of S72. In S174, the CPU 22 specifies, from the cartridge table 36, K1 pieces of determination information associated with the K1 serial numbers specified in S72. Then, the CPU 22 specifies K2 pieces of determination information that each indicate a determination date and time from among the K1 pieces of determination information. As a result, the CPU 22 specifies K2 serial numbers associated with the K2 pieces of determination information.

In S176, the CPU 22 selects, from among the specified K2 serial numbers, a target serial number that is associated with target determination information indicating the oldest determination date and time among the K2 pieces of determination information. When S176 is completed, the CPU 22 proceeds to S78.

For example, in Case C1 of FIG. 6, a situation is assumed in which three pieces of determination information indicating three sets of determination dates and times are stored in the cartridge table 36, instead of three pieces of remaining amount information. In this case, after having sent to the shipping server 900 three order signals for shipping three ink cartridges to the user, the SP server 10 uses the three pieces of determination information indicating the determination dates and times (such as three pieces of determination information corresponding to the three serial numbers SN1 to SN3) to select, from among the three serial numbers SN1 to SN3, a serial number (such as SN1) that is associated with the determination information indicating the oldest determination date and time among the three pieces of determination information (see T78 of FIG. 6). Then, the SP server 10 sends a notification display request to the printer (such as 100) identified by the serial number (such as SN1) (see T80). As a result, this printer displays the notification screen indicating that the ink cartridge should be exchanged (see T82). As such, the user can easily find the printer 100 of which ink cartridge should be exchanged from among the three printers 100 to 300. The determination information and the determination information indicating the determination date and time are respectively examples of "consumable article information" and "consumable article exchange condition".

(Variant 1) The "N devices" are not limited to the three printers 100 to 300, and may be N scanners or N terminal devices. For example, when the N devices are N scanners, "consumable article" may be a part that needs to be exchanged periodically (such as a belt).

(Variant 2) The "memory" is not limited to the memory 24 of the SP server 10, and may be an external memory configured separately from the SP server 10, for example.

(Variant 3) In the respective embodiments as above, the communication system 2 is provided with the shipping server 900, and the SP server 10 sends order signals to the shipping server 900 (S34 of FIG. 4). Instead of this, the communication system 2 may not be provided with the shipping server 900, and the SP server 10 may notify a worker of an instruction to ship an ink cartridge, in the case of determining YES in S32 of FIG. 4. In this variant, notifying the worker of the instruction to ship the ink cartridge is an example of "shipping process".

(Variant 4) In the respective embodiments as above, the SP server 10 sends the notification display request to the target printer (S78 of FIG. 5). Instead of this, the SP server 10 may send a command to a terminal device (such as 500) for requesting this terminal device to display the notification screen indicating that the ink cartridge of the target printer should be exchanged. In this variant, the terminal device is an example of "external device".

(Variant 5) In the respective embodiments as above, the printer 100 displays the notification screen (T82 of FIG. 6). Instead of this, the printer 100 may turn on a lamp for notifying the user of exchange of the ink cartridge. In this variant, turning on the lamp is an example of "first notification process (and second notification process)".

(Variant 6) In the respective embodiments as above, the state notification includes the remaining amount information. Instead of this, the state notification may include used amount information indicating a used amount of the ink in the ink cartridge. In this variant, the used amount information is an example of "consumable article information". Further, "colorant" is not limited to the ink for inkjet scheme but may be toner for laser scheme.

(Variant 7) In the first embodiment as above, the process of S76 is executed after the process of S74 in FIG. 5. Instead of this, the process of S74 (that is, the determination on whether or not the remaining amount corresponding to the selected serial number is equal to or less than the threshold) may be executed after the process of S76 (that is, the selection of the serial number with the lowest remaining amount). In this variant, executing the process of S74 after the process of S76 is an example of "select first device identification information".

(Variant 8) The process of Case C2 may not be executed. Generally speaking, the situation in which only one consumable article is shipped as the result of the shipping process for shipping two consumable articles having been executed may not be considered.

(Variant 9) The process of Case C3 may not be executed. In this variant, "receive exchange information" may be omitted.

(Variant 10) The process of S50 of FIG. 4 may not be executed. Instead of this, the SP server 10 may execute the processes of S60 and S62 immediately after having acquired a shipped number and a shipping date and time from the shipping server 900. In this variant, "predetermined time" may be omitted.

(Variant 11) In each of the above embodiments, the respective processes of FIGS. 3 to 10 are implemented by software (i.e., the program 30). Instead of this, one or more of the processes may be implemented by hardware such as a logic circuit.

What is claimed is:
1. A server comprising:
a processor; and
a storage storing computer-readable instructions therein, wherein the computer-readable instructions, when executed by the processor, cause the server to:
from each of N devices (the N being an integer of 2 or larger) which are capable of having a same consumable article mounted thereon, receive device identification information identifying the device and consumable article information related to a consumable article currently mounted on the device;
in a case where N pieces of the device identification information and N pieces of the consumable article information are received from the N devices, store each of the N pieces of the device identification information in association with the consumable article information received with the device identification information in a memory;
in a case where N1 pieces of the consumable article information (the N1 being an integer satisfying 2≤N1≤N) among the N pieces of the consumable article information in the memory satisfy a predetermined consumable article exchange condition, execute a shipping process for shipping N1 consumable articles to a user of the N devices;
after the shipping process has been executed, select first device identification information from among N2 pieces of the device identification information (the N2 being an integer satisfying 2≤N2≤N1) by using N2 pieces of the consumable article information among the N1 pieces of the consumable article information, the N2 pieces of the device identification information being in association with the N2 pieces of the consumable article information, and the first device identification information identifying a first device of which consumable article is to be exchanged first among N2 devices; and
send a first notification execution request to an external device, the first notification execution request being for causing the external device to execute a first notification process, and the first notification process being for notifying the user that the consumable article of the first device identified by the first device identification information is to be exchanged.
2. The server as in claim 1, wherein
each of the N devices is a printer capable of executing a print function,
the consumable article is a cartridge storing a colorant used for the print function,
the consumable article information indicates a remaining amount of the colorant in the consumable article,
in a case where the remaining amount indicated by the consumable article information reaches a predetermined threshold, the consumable article information satisfies the consumable article exchange condition, and
the first device identification information is device identification information associated with first consumable article information indicating a lowest remaining amount among the N2 pieces of the consumable article information.
3. The server as in claim 2, wherein
the external device is the first device,
the computer-readable instructions, when executed by the processor, further cause the server to:
in a case where the consumable article of the first device is exchanged after the first notification execution request has been sent to the first device, receive exchange information from the first device, the exchange information indicating that the consumable article of the first device has been exchanged;

in a case where the exchange information is received from the first device, select second device identification information from among (N2-1) pieces of the device identification information in the memory by using (N2-1) pieces of the consumable article information among the N2 pieces of the consumable article information, the (N2-1) pieces of the consumable article information not including the first consumable article information, the (N2-1) pieces of the device identification information being in association with the (N2-1) pieces of the consumable article information, the second device identification information identifying a second device of which consumable article is to be exchanged first, and the second device being different from the first device; and send a second notification execution request to the second device, the second notification execution request being for causing the second device to execute a second notification process, and the second notification process being for notifying the user that the consumable article of the second device is to be exchanged.

4. The server as in claim 1, wherein in a case where a sender device which is a sender of one of the N pieces of the consumable article information determines that the consumable article which is currently mounted in the sender device is to be exchanged, the consumable article information indicates a determination date and time when the sender device made the determination, in a case where the sender device does not determine that the consumable article which is currently mounted in the sender device is to be exchanged, the consumable article information does not indicate the determination date and time, in a case where the consumable article information indicates the determination date and time, the consumable article information satisfies the consumable article exchange condition, and the first device identification information is device identification information in association with first consumable article information indicating an earliest determination date and time among the N2 pieces of the consumable article information.

5. The server as in claim 4, wherein the external device is the first device, the computer-readable instructions, when executed by the processor, further cause the server to:

in a case where the consumable article of the first device is exchanged after the first notification execution request has been sent to the first device, receive exchange information from the first device, the exchange information indicating that the consumable article of the first device has been exchanged;

in a case where the exchange information is received from the first device, select second device identification information from among (N2-1) pieces of the device identification information in the memory by using (N2-1) pieces of the consumable article information among the N2 pieces of the consumable article information, the (N2-1) pieces of the consumable article information not including the first consumable article information, the (N2-1) pieces of the device identification information being in association with the (N2-1) pieces of the consumable article information, the second device identification information identifying a second device of which consumable article is to be exchanged first, and the second device being different from the first device; and send a second notification execution request to the second device, the second notification execution request being for causing the second device to execute a second notification process, and the second notification process being for notifying the user that the consumable article of the second device is to be exchanged.

6. The server as in claim 1, wherein the computer-readable instructions, when executed by the processor, further cause the server to:

in a case where the consumable article of the first device is exchanged after the first notification execution request has been sent to the external device, receive exchange information from the first device, the exchange information indicating that the consumable article of the first device has been exchanged; and in a case where each of the N1 and the N2 is an integer of 2 and the exchange information is received from the first device after two consumable articles have been shipped as a result of the shipping process having been executed, send a second notification execution request to the external device, the second notification execution request being for causing the external device to execute a second notification process, the second notification process being for notifying the user that the consumable article of a second device is to be exchanged, the second device being identified by second device identification information among the N2 pieces of the device identification information, and the second device identification information being different from the first device identification information, wherein in a case where each of the N1 and the N2 is an integer of 2 and only one consumable article has been shipped as a result of the shipping process having been executed, the second notification execution request is not sent even if the exchange information is received from the first device.

7. The server as in claim 1, wherein the first device identification information is selected from among the N2 pieces of the device identification information by using the N2 pieces of the consumable article information after a predetermined time has elapsed from a shipping date and time when the N1 consumable articles were shipped, and the first notification execution request is sent to the external device after the predetermined time has elapsed from the shipping date and time.

8. The server as in claim 7, wherein the N pieces of the consumable article information include third consumable article information received from a third device, the N1 pieces of the consumable article information include the third consumable article information, wherein the computer-readable instructions, when executed by the processor, further cause the server to:

in a case where the consumable article of the third device has been exchanged before the predetermined time elapses from the shipping date and time, receive exchange information from the third device, the exchange information indicating that the consumable article of the third device has been exchanged, wherein the N2 pieces of the consumable article information does not include the third consumable article information in a case where the exchange information is received from the third device.

9. The server as in claim 1, wherein the first notification process includes a process of displaying a message that indicates the consumable article of the first device is to be exchanged.

10. The server as in claim 1, wherein the N2 pieces of the consumable article information are identical to the N1 pieces of the consumable article information.

11. A non-transitory computer-readable medium storing computer-readable instructions for a server, wherein the computer-readable instructions, when executed by a processor of the server, cause the server to:
- from each of N devices (the N being an integer of 2 or larger) which are capable of having a same consumable article mounted thereon, receive device identification information identifying the device and consumable article information related to a consumable article currently mounted on the device;
- in a case where N pieces of the device identification information and N pieces of the consumable article information are received from the N devices, store each of the N pieces of the device identification information in association with the consumable article information received with the device identification information in a memory;
- in a case where N1 pieces of the consumable article information (the N1 being an integer satisfying $2 \leq N1 \leq N$) among the N pieces of the consumable article information in the memory satisfy a predetermined consumable article exchange condition, execute a shipping process for shipping N1 consumable articles to a user of the N devices;
- after the shipping process has been executed, select first device identification information from among N2 pieces of the device identification information (the N2 being an integer satisfying $2 \leq N2 \leq N1$) by using N2 pieces of the consumable article information among the N1 pieces of the consumable article information, the N2 pieces of the device identification information being in association with the N2 pieces of the consumable article information, and the first device identification information identifying a first device of which consumable article is to be exchanged first among N2 devices; and
- send a first notification execution request to an external device, the first notification execution request being for causing the external device to execute a first notification process, and the first notification process being for notifying the user that the consumable article of the first device identified by the first device identification information is to be exchanged.

* * * * *